(12) United States Patent
Milevschi et al.

(10) Patent No.: US 11,372,386 B2
(45) Date of Patent: Jun. 28, 2022

(54) SYSTEM AND METHOD FOR PROVIDING NOTIFICATIONS

(71) Applicant: Hubbell Incorporated, Shelton, CT (US)

(72) Inventors: Sarah Milevschi, Simsbury, CT (US); Shawn Monteith, Clinton, CT (US)

(73) Assignee: Hubbell Incorporated, Shelton, CT (US)

( * ) Notice: Subject to any disclaimer, the term of this patent is extended or adjusted under 35 U.S.C. 154(b) by 157 days.

(21) Appl. No.: 16/740,740

(22) Filed: Jan. 13, 2020

(65) Prior Publication Data
US 2020/0241493 A1     Jul. 30, 2020

Related U.S. Application Data

(60) Provisional application No. 62/796,620, filed on Jan. 25, 2019.

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
CPC ........ G05B 19/042; G05B 2219/25011; G05B 23/0272; G05B 2219/2642; G05B 15/02
See application file for complete search history.

(56) References Cited

U.S. PATENT DOCUMENTS

| | | | |
|---|---|---|---|
| 2009/0204977 A1 | 8/2009 | Tavares et al. | |
| 2013/0017829 A1 | 1/2013 | Kim et al. | |
| 2014/0365530 A1* | 12/2014 | Kerfoot | G06F 16/23 707/797 |
| 2015/0067154 A1* | 3/2015 | Ly | H04L 67/26 709/224 |
| 2015/0134761 A1 | 5/2015 | Sharma et al. | |
| 2016/0087955 A1 | 3/2016 | Mohamad Abdul et al. | |
| 2016/0197786 A1 | 7/2016 | Britt et al. | |

(Continued)

OTHER PUBLICATIONS

Azzola, "Building on IoT Notification System." In: DZone Jan. 7, 2018 (Jan. 7, 2018) from <https://dzone.com/articles/building-an-iot-notification-system> entire document.

(Continued)

*Primary Examiner* — Mohammad Ali
*Assistant Examiner* — Sheela Rao
(74) *Attorney, Agent, or Firm* — Michael Best & Friedrich LLP

(57) ABSTRACT

A method for providing a notification associated with at least one of a plurality of connected devices is provided. The method includes obtaining, by one or more computing devices, data from one or more connected devices. The method further includes determining, by the one or more computing devices, occurrence of an event based, at least in part, on the data obtained from the one or more connected devices. In addition, the method includes accessing, by the one or more computing devices, a multi-tier notification tree. The method further includes providing, by the one or more computing devices, a notification indicative of the event to one or more recipients included in the multi-tier notification tree.

20 Claims, 10 Drawing Sheets

(56) References Cited

U.S. PATENT DOCUMENTS

2016/0353305 A1 12/2016 Zakaria et al.
2018/0061220 A1* 3/2018 Greene .............. G06K 9/00771

OTHER PUBLICATIONS

PCT/US2020/013281 International Search Report and Written Opinion dated Apr. 1, 2020 (13 pages).
U.S. Appl. No. 16/032,561, filed Jul. 11, 2018, Gould et al.
U.S. Appl. No. 15/625,663, filed Jun. 16, 2017, Gould et al.

* cited by examiner

US 11,372,386 B2

SYSTEM AND METHOD FOR PROVIDING NOTIFICATIONS

PRIORITY CLAIM

The present application claims the benefit of priority of U.S. Provisional App. No. 62/796,620, titled "System and Method for Providing Notifications," having a filing date of Jan. 25, 2019, which is incorporated by reference herein.

FIELD

The present disclosure relates generally to connected devices and, more particularly, to systems and methods for providing notifications based on data obtained from one or more connected devices.

BACKGROUND

With the advance of Internet of Things (IoT) technology (i.e., physical objects (or groups of such objects) that are embedded with sensors, processing ability, software, and other technologies, and that connect and exchange data with other devices and systems over the Internet or other communications networks), connected devices (e.g., thermostat, light bulb, etc.) located throughout a building or space can collect data that can be processed to monitor activity within the building or space. Notifications can be generated based on the data and can indicate occurrence of an event within the building or space. For instance, the notifications can indicate occurrence of an emergency event (e.g., fire, burglary, etc.) within the building or space. The notifications can be presented on a display associated with user devices (e.g., smartphone, tablet, etc.) of one or more recipients. In this manner, the one or more recipients can be notified of the event.

SUMMARY

Aspects and advantages of embodiments of the present disclosure will be set forth in part in the following description, or may be learned from the description, or may be learned through practice of the embodiments.

In one aspect, a method for providing a notification associated with at least one of a plurality of connected devices is provided according to example embodiments of the present disclosure. The method can include obtaining, by one or more computing devices, data from one or more connected devices. The method can include determining, by the one or more computing devices, occurrence of an event based, at least in part, on the data obtained from the one or more connected devices. The method can include accessing, by the one or more computing devices, a multi-tier notification tree. The method can include providing, by the one or more computing devices, a notification indicative of the event to one or more recipients included in the multi-tier notification tree.

In another aspect, a system for providing a notification associated with at least one of a plurality of connected devices is provided. The system includes one or more computing devices. The one or more computing devices are configured to obtain data from one or more connected devices. The one or more computing devices are further configured to determine occurrence of an event based, at least in part, on the data obtained from the one or more connected devices. The one or more computing devices are configured to access a multi-tier notification tree. The one or more computing devices are further configured to provide a notification to one or more recipients included in the multi-tier notification tree, the notification indicative of occurrence of the event.

Other examples aspects of the present disclosure are directed to apparatus, methods, electronic devices, non-transitory computer-readable media, and systems.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
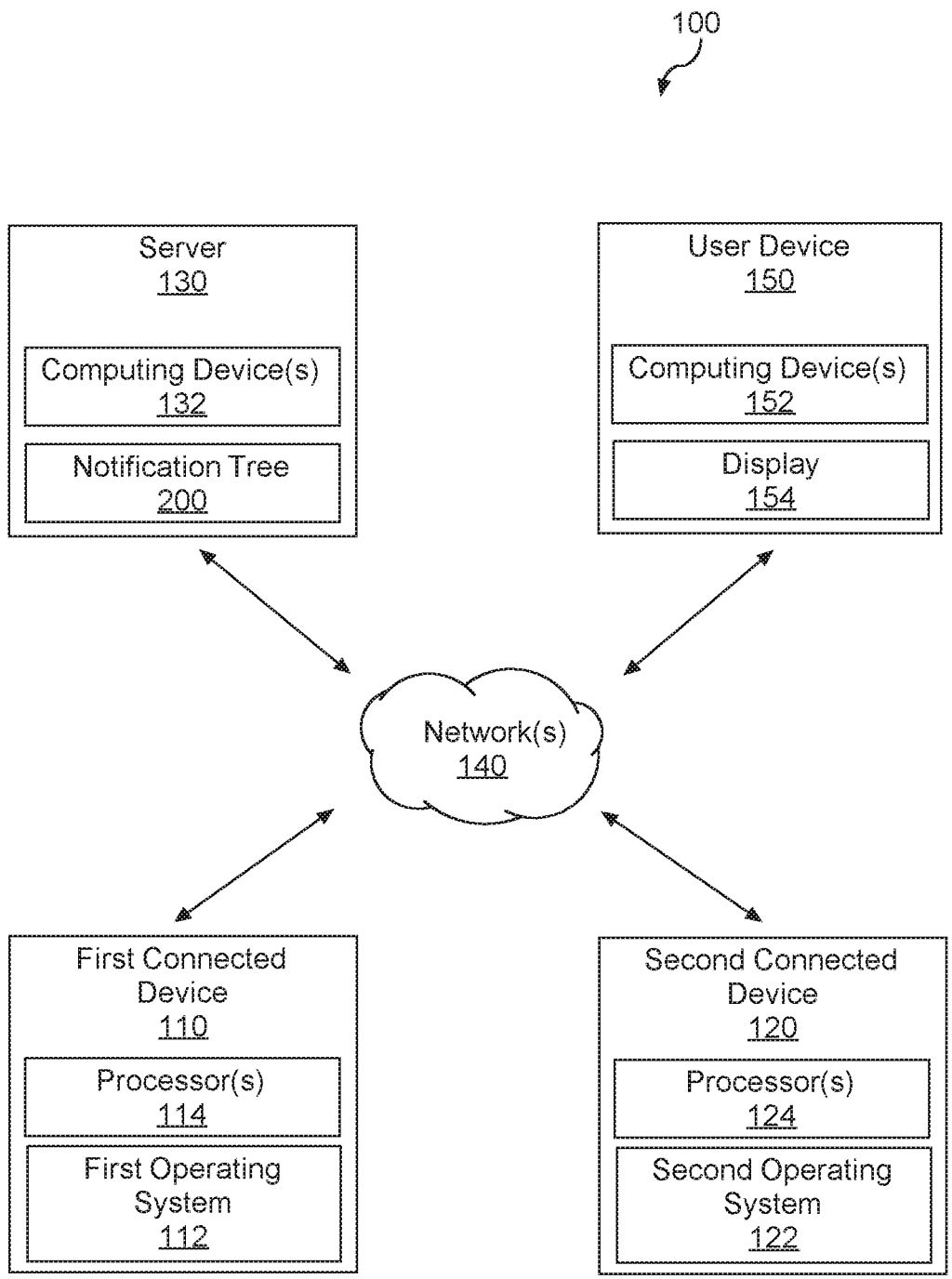
FIG. 1 depicts a schematic of an example computing environment according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a system for providing a notification associated with at least one of a plurality of connected devices associated with a building or space. The system can include one or more computing devices. The one or more computing devices can be configured to obtain data from one or more connected devices associated with the building or space. Examples of connected devices can include, without limitation, appliances (e.g., refrigerators, washing machines, dryers, water heaters, dishwashers, etc.), thermostats, smoke detectors, light bulbs, light switches, garage door openers, doorbells, cameras (e.g., security cameras), motion sensors, humidity sensors, or water valve sensors. However, it should be appreciated that connected devices can include any suitable type of IoT device.

In some implementations, the one or more connected devices can include a first connected device associated with a first ecosystem or platform and a second connected device associated with a second ecosystem or platform. The first connected device can include one or more processors configured to implement a first operating system. The second connected device can include one or more processors configured to implement a second operating system. In some implementations, the second operating system (e.g., Android™ can be different than the first operating system (e.g., iOS™). In this manner, the one or more computing devices can be configured to obtain data from connected devices configured to implement different operating systems. It should be appreciated, however, that the first connected device of the first ecosystem and the second connected device of the second ecosystem can, in some implementations, be configured to implement the same operating system. As will be discussed below in more detail, data obtained from the first connected device and the second connected device can be processed and notifications indicative of events (e.g., fire, flood, active shooting, etc.) occurring with the building or space can be provided to one or more recipients included in a notification tree associated with the building.

The one or more computing devices can be configured to determine occurrence of an event within the building or space based, at least in part, on the data obtained from the one or more connected devices. For example, the one or more computing devices can be configured to determine occurrence of an emergency event within the building, such as a fire or carbon monoxide (CO) leak. As another example, the one or more computing devices can be configured to determine presence of one or more persons within the building or space based, at least in part, on data (e.g., audio and/or visual) obtained from the one or more connected devices. As will be discussed below in more detail, the one or more computing devices can be configured by an administrator or user to provide a notification indicative of the event to one or more recipients included in a multi-tier notification tree.

The one or more computing devices can be configured to access the notification tree and provide the notification to the one or more recipients included in the notification tree. In some implementations, the notification tree can include multiple tiers. Each tier of the multi-tier notification tree can include one or more recipients. In some implementations, the one or more computing devices can be configured to provide the notification to one or more recipients included in a first tier of the notification tree. If the one or more recipients included in the first tier fail to acknowledge the notification within a predetermined amount of time, the one or more computing devices can be further configured to provide the notification to one or more recipients included in another tier (e.g., second tier, third tier, etc.) of the notification tree. For instance, the notification can be provided to one or more recipients included in a second tier of the notification tree. Furthermore, if the one or more recipients included in the second tier of the notification tree fail to acknowledge the notification, the notification can then be provided to one or more recipients included in a third tier of the notification tree. It should be appreciated that, in some implementations, the notification can continue to be provided to successive tiers of the notification tree until the notification is acknowledged.

In some implementations, the one or more computing devices can be configured to provide the notification to every recipient included in the notification tree. For example, when the notification is indicative of an emergency event (e.g., fire, carbon monoxide leak, etc.), the one or more computing devices can be configured to provide the notification to every recipient included in the notification tree. As will be discussed below in more detail, the one or more computing devices can be configured to dynamically update the notification tree based, at least in part, on user data associated with one or more recipients included in the notification tree.

In some implementations, the one or more computing devices can be configured to obtain recipient data associated with one or more recipients included in the notification tree. For example, the one or more computing devices can obtain user data from a user device (e.g., smartphone, tablet, laptop, desktop, etc.) of a recipient included in the notification tree. The one or more computing devices can be configured to determine a location of the recipient based, at least in part, on the user data. For example, the user data can include location data (e.g., GPS coordinates) indicative of a location of the user device. As another example, the user data can include calendar data associated with an electronic calendar stored on the user device. The one or more computing devices can be configured to determine whether the recipient is present within the building or space based, at least in part, on the user data. If the user data indicates the recipient is present within the building or space and the recipient is not currently included in the highest priority tier of the notification tree, the one or more computing devices can be configured to promote the recipient from a lower priority tier to the highest priority tier. In some implementations, the one or more computing devices can be further configured to demote the recipient when user data associated with the recipient indicates the recipient is no longer present in the building or space. For example, the one or more computing devices can be configured to demote the recipient back to the lower priority tier of the notification tree.

In some implementations, one or more recipients within the building and included in a lower priority tier of the notification tree can be promoted to the highest priority tier of the notification tree only for the duration of an event occurring within the building. For instance, the one or more computing devices can be configured to demote the one or more recipients to the lower priority tier once a notification indicative of the event is acknowledged by a recipient included in the notification tree.

In some implementations, a recipient can receive a notification to join the notification tree via an application (e.g., web-based, mobile app, etc.) executed via one or more computing devices of the user device associated with the recipient. If the recipient wishes to join the notification tree, the recipient can be required to consent to collection of user data indicative of location of the recipient. It should be appreciated that, in some implementations, consenting to collection of user data can be a precondition to joining the notification tree. Additionally, once the recipient consents to collection of user data, the user data can be treated in one or more ways to remove personally identifiable information. For example, the user data can be treated so that an identity of the recipient cannot be determined from the user data. In this manner, the system of the present disclosure can safeguard the privacy of the one or more recipients included in the notification tree.

In some implementations, the one or more computing devices can be configured to provide a notification if a recipient included in the notification tree repeatedly dismisses notifications indicative of events occurring within the building or space. For example, the notification can be provided to a building administrator or homeowner associated with the building or space. The building administrator or homeowner can then decide to remove the recipient from the notification tree based, at least in part, on the notification indicative of the recipient repeatedly ignoring notifications of events occurring within the building or space.

In some implementations, authorized persons (e.g., building administrator, homeowner, selected recipient(s) included in the notification tree) can select the types of events for which notifications should be provided. For instance, authorized persons may opt to receive a notification each time motion is detected within a room or area of the building. Alternatively or additionally, authorized persons may opt to receive a notification each time a temperature of the room or area deviates from a setpoint by a predetermined amount.

In some implementations, the one or more computing devices can be configured to provide a status report to the one or more recipients included in the notification tree. The status report can be provided to a recipient in the multi-tier notification tree via a notification (e.g., text message, email, etc.) sent to a user device (e.g., smartphone, tablet, laptop, etc.) associated with the recipient. For instance, the one or more computing devices can be configured to provide the status report at predetermined intervals of time (e.g., hourly, daily, monthly, etc.). Alternatively or additionally, the one or more computing devices can be configured to generate the status report in response to user-input received from a recipient included in the notification tree. In this manner, the status report can be generated on-demand.

In some implementations, one or more recipients included in the notification tree can share the status report with one or more recipients not included in the notification tree. For instance, the one or more recipients can share a notification indicative of an emergency event (e.g., fire, active shooting, etc.) within the building to emergency personnel that is not included in the notification tree. In this manner, emergency personnel can be notified of the emergency event and can render aid to one or more recipients present within the building.

In some implementations, the status report can indicate a status of the one or more connected devices associated with the building or space. For instance, the status report can indicate whether the one or more connected devices are active (e.g., online) or inactive (e.g. offline). In some implementations, the status report can indicate whether any data was lost while the one or more connected devices were inactive (e.g., offline). Alternatively or additionally, the status report can indicate whether a notification of an event was not provided as a result of the one or more connected devices being inactive (e.g., offline).

In some implementations, authorized persons can opt-in to receive the status reports. In this manner, authorized persons can control whether they receive the status report. Alternatively or additionally, authorized persons can adjust which recipients included in the notification tree can have access to the status reports. In some implementations, authorized persons can adjust how often the status reports are provided to selected recipients in the notification tree.

In some implementations, the one or more computing devices can be configured to determine routines based, at least in part, on the data obtained from the one or more connected devices. For example, if the one or more computing devices obtain data indicative of a front door of the building or space opening every day at 3:00 PM, the one or more computing devices can be configured to provide a notification on days the door does not open at 3:00 PM. In this manner, the one or more computing devices can provide notifications indicative of deviations from what the one or more computing devices have determined are routine events.

As used herein, the term "connected device" refers to a device capable of communicating with another device over a wireless network. In addition, the term "server" may correspond to physical computing devices or virtual machines hosted on physical computing devices. The term "notification" may include, without limitation, visual notifications (e.g., text message, email), audible notifications (e.g., phone call, audible alert), or both.

The system of the present disclosure provides numerous technical benefits. For instance, the computing devices of the system can be configured to dynamically update the notification tree based, at least in part, on user data associated with each recipient in the notification tree and indicative of a location of each recipient. For example, the computing devices can be configured to promote a recipient included in a lower priority tier (e.g., second tier, third tier, etc.) of the notification tree to the highest priority tier (e.g., first tier) of the notification tree while user data associated with the recipient indicates the recipient is in the building.

Referring now to the Figures, FIG. 1 depicts an example embodiment of a system 100 for providing a notification associated with at least one of a plurality of connected devices (e.g., thermostat, wall-plug, light bulb, etc.) associated with a building or space. In some implementations, the plurality of connected devices can include a first connected device 110 of a first ecosystem or platform (e.g., Apple HomeKit™) and a second connected device 120 of a second ecosystem or platform (e.g., Amazon Alexa™ or Google Home™). The first connected device 110 can include one or more processors 114 configured to implement a first operating system 112. The second connected device 120 can include one or more processors 124 configured to implement a second operating system 122. In some implementations, the first operating system 112 (e.g., iOS™) can be different than the second operating system 122 (e.g., Android™, Windows™, Linux™, Macintosh™, Chrome OS™, Blackberry™, etc.). In alternative implementations, the first operating system 112 can be the same as the second operating system 122.

As shown, the system 100 can include a server 130 configured to communicate with the plurality of connected devices (e.g., first connected device 110 and second connected device 120) over one or more networks 140. In this manner, the server 130 can obtain data from the plurality of connected devices. It should be appreciated that the one or more networks 140 can include any suitable type of network, such as a local area network (e.g., intranet), a wide area network (e.g., internet), a low power wireless network (e.g., Bluetooth Low Energy (BLE)™ Zigbee™, etc.), cellular network, or some combination thereof and can include any number of wired or wireless links. In general, communication over the one or more networks 140 can be implemented via any type of wired or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example communication protocols can include, for instance, Bluetooth low energy, Bluetooth mesh networking, near-field communication, Wi-Fi™ (e.g., IEEE, 802.11), Wi-Fi Direct™ (for peer-to-peer communication), Z-Wave™, Zigbee™, Halow™, cellular communication, LTE™, LoRa™, or low-power wide area networking. Other suitable wired and/or wireless communication protocols can be used without deviating from the scope of the present disclosure.

In some implementations, the system 100 can include one or more wireless access points (not shown) configured to facilitate communication between the server 130 and the plurality of connected devices (e.g., first connected device 110 and second connected device 120). For example, the one or more wireless access points can include a router configured to obtain data from the plurality of connected devices and communicate the data to the server 130. It should be appreciated that the wireless access points can include any suitable device configured to facilitate communication between the server 130 and the plurality of connected devices.

In some implementations, the one or more wireless access points can be configured to store data obtained from the plurality of connected devices. Alternatively or additionally, the system can include one or more hub devices separate from the server 130 and communicatively coupled to the one or more wireless access points. The one or more hub devices can be configured to store the data obtained from the plurality of connected devices. In this manner, the data obtained from the plurality of connected devices can be stored via the one or more wireless access points, one or more hub devices, or both.

Figure 2:
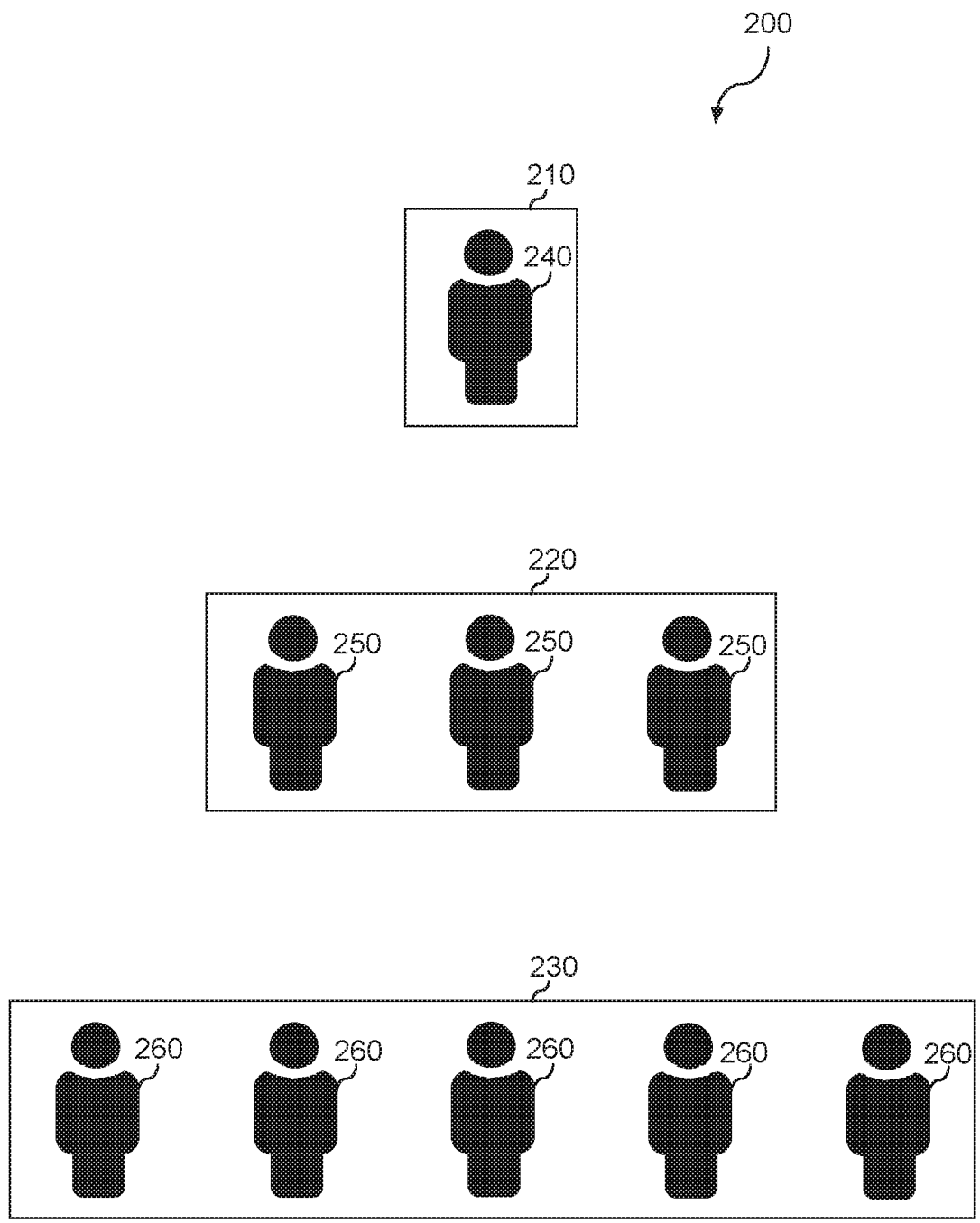
FIG. 2 depicts a notification tree according to example embodiments of the present disclosure.

In some implementations, the server 130 can include one or more computing devices 132. The one or more computing devices 132 can be configured to process data obtained from the plurality of connected devices to determine occurrence of an event (e.g., fire, carbon monoxide leak, etc.) associated with the building or space. The one or more computing devices 132 can be further configured to access a notification tree 200 (FIG. 2). In some implementations, the notification tree 200 can be stored in a memory device associated with the one or more computing devices 132. It should be appreciated, however, that the notification tree 200 can be stored at any suitable location. For example, in some implementations, the notification tree 200 can be stored in memory associated with the one or more wireless access points, and/or the one or more hub devices. Alternatively or additionally, the notification tree 200 can be stored in memory associated with a user device 150 of one or more recipients included in the notification tree 200.

In some implementations, the one or more computing devices 132 can be configured to obtain user data associated with the one or more recipients included in the notification tree 200. For instance, the one or more computing devices 132 can obtain the user data via the user device 150 (e.g., smartphone, tablet, laptop, etc.) associated with a recipient included in the notification tree 200. In some implementations, the user data can include location data (e.g., GPS data) obtained from the user device 150. Alternatively or additionally, the user data can include calendar data associated with an electronic calendar stored on a memory device (not shown) of the user device 150.

In some implementations, the one or more computing devices 132 can be configured to dynamically update the notification tree 200 based, at least in part, on the user data obtained for one or more recipients included in the notification tree. For instance, when user data associated with a recipient included in a lower priority tier (e.g., second tier, third tier, etc.) of the notification tree 200 indicates the recipient is present within the building or space, the one or more computing devices 132 can be configured to promote the recipient to the highest priority tier (e.g., first tier) of the notification tree 200. In some implementations, the one or more computing devices 132 can be further configured to demote the recipient when user data associated with the recipient indicates the recipient is no longer present within the building or space. For instance, the one or more computing devices 132 can be configured to demote the recipient back to the lower priority tier of the notification tree 200.

In some implementations, the building or space may be associated with a vacation home. In such implementations, the one or more computing devices 132 can be configured to dynamically add one or more recipients that are included in the notification tree and not present at the vacation home. As such, the one or more recipients can receive notifications indicative of events occurring within the vacation house even though the one or more recipients are not present within the vacation house.

In some implementations, the one or more computing devices 132 can be configured to provide a report indicative of a status of the plurality of connected devices. For instance, the report can be provided over the one or more networks 140 to user devices 150 of one or more recipients included in the notification tree 200. In some implementations, the report can indicate a status of the first connected device 110 and/or the second connected device 120. For example, the report can indicate whether the first connected device 110 and/or the second connected device 120 is active (e.g., online) or inactive (e.g., offline). In this manner, the one or more recipients can determine whether the first connected device 110 and/or the second connected device 120 is active or inactive based, at least in part, on the report.

Referring now to FIG. 2, a multi-tier notification tree 200 is provided according to example embodiments of the present disclosure. As shown, the notification tree 200 can include a first tier 210, a second tier 220, and a third tier 230. It should be appreciated, however, that the notification tree can include more or fewer tiers. As shown, the first tier 210, second tier 220, and third tier 230 can each include one or more recipients. In example embodiments, a priority of the first tier 210 can be higher compared to a priority of the second tier 220. Additionally, the priority of the second tier 220 can be higher compared to a priority of the third tier 230. In this manner, the notification can initially be provided to user devices 150 (FIG. 1) associated with one or more recipients 240 included in the first tier 210 of the notification tree 200. If the one or more recipients 240 included in the first tier 210 do not acknowledge the notification within a predetermined amount of time, the notification can then be provided to one or more recipients 250 included in the second tier 220 of the notification tree 200. Then, if the one or more recipients 250 included in the second tier 220 do not acknowledge the notification within a predetermined amount of time, the notification can be provided to one or more recipients 260 included in the third tier 230 of the notification tree 200.

In some implementations, an authorized person (e.g., homeowner, building administrator) can acknowledge the notification and cancel the notification. In this manner, the authorized person can prevent communication of the notification to recipients included in tiers of the notification tree 200 having a priority lower than the priority of the tier that includes the authorized person. It should be appreciated that each recipient included in the notification tree can acknowledge a notification indicative of an event occurring within the building or space. However, as discussed above, only authorized persons, such as homeowners or building administrators, can cancel the notification.

In some implementations, the one or more recipients 240 included in the first tier 210 of the notification tree 200 can include a homeowner and/or an administrator of the building or space. Alternatively or additionally, the one or more recipients 250 included in the second tier 220 of the notification tree 200 can include neighbors, family members of the homeowner, emergency personnel, and/or building personnel. In some implementations, the one or recipients 260 included in the third tier 230 of the notification tree 200 can include emergency personnel (e.g., 911 dispatch operator). It should be appreciated, however, that each tier (e.g., first tier 210, second tier 220, third tier 230, etc.) of the notification tree 200 can include any type (e.g., building admin, building personnel, family, neighbor, emergency personnel) of recipient.

Figure 3:
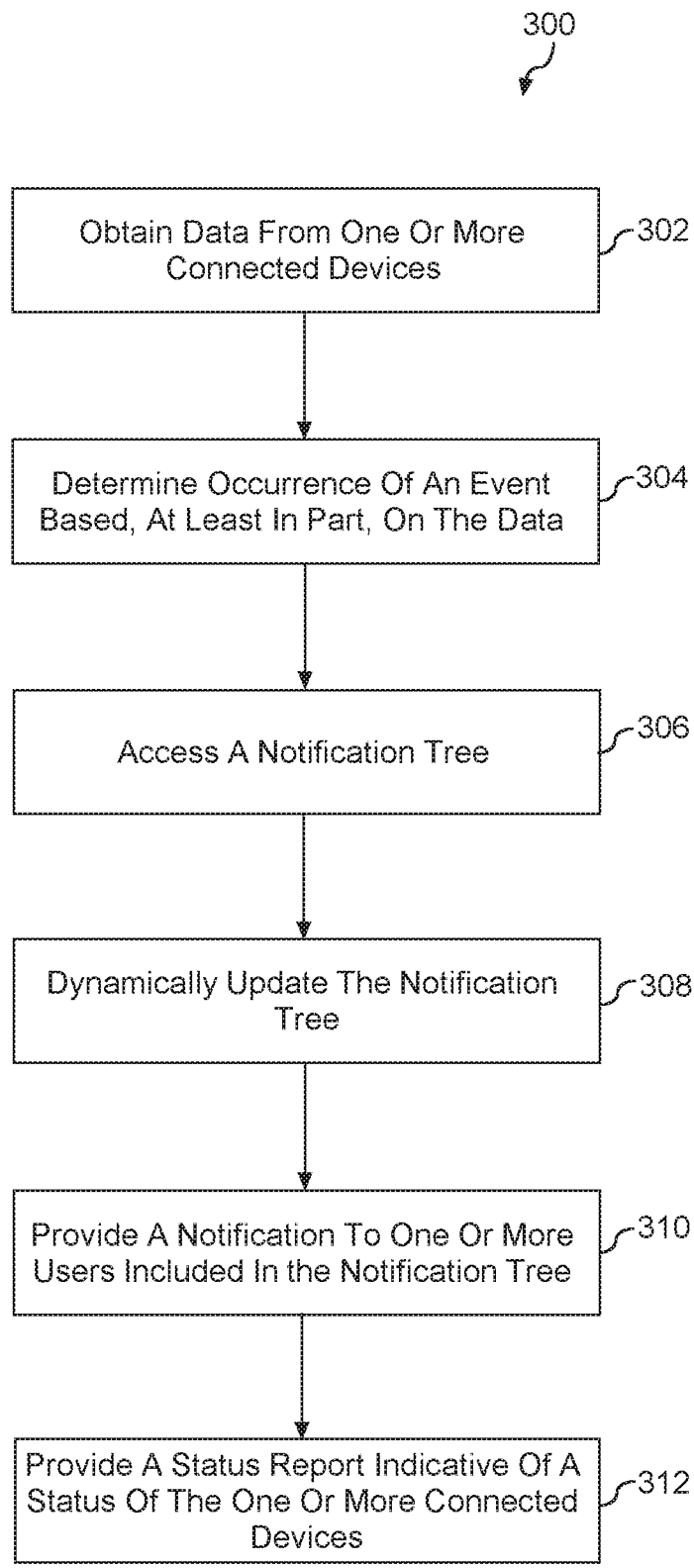
FIG. 3 depicts a flow diagram of a method for providing a notification according to example embodiments of the present disclosure.

Referring now to FIG. 3, a flow diagram of a method 300 for providing a notification associated with at least one of a plurality of connected devices associated with a building or space is provided according to example embodiments of the present disclosure. It should be appreciated that the method 300 can be implemented using the system discussed above with reference to FIG. 1. FIG. 3 depicts steps performed in a particular order for purposes of illustration and discussion. Those of ordinary skill in the art, using the disclosures provided herein, will understand that various steps of the method 300 may be adapted, modified, rearranged, performed simultaneously or modified in various ways without deviating from the scope of the present disclosure.

At (302), the method 300 can include obtaining, by one or more computing devices, data from one or more connected devices associated with the building or space. For instance, the one or more computing devices can obtain data from a first connected device of a first ecosystem or platform and a second connected device of a second ecosystem or platform. In some implementations, the first connected device can be configured to implement a first operating system and the second connected device can be configured to implement a second operating system that is different than the first operating system. It should be appreciated, however, that the one or more computing devices can obtain data from any suitable number of connected devices.

At (304), the method 300 includes determining, by the one or more computing devices, occurrence of an event based, at least in part, on the data obtained at (302). In example embodiments, the one or more computing devices can determine occurrence of an emergency event (e.g., fire, Carbon Monoxide (CO) leak, etc.) based, at least in part, on the data obtained at (302). Alternatively or additionally, the event can correspond to detection of a person within the building or space. For instance, the data can include audio data indicative of presence of the person within the building or space. Alternatively or additionally, the data can include video data indicative of presence of the person within the building or space. It should be appreciated that the data can include any suitable type of data indicative of presence of the person within the building. For instance, the data can include motion data indicative of movement of the person within the building.

It should be appreciated that data indicative of presence of the person can be used to determine location and/or movement of the person within the building or space. For instance, if the data obtained at (302) indicates presence of the person on a first floor of the building or space and subsequently (e.g., later) indicates presence of the person on a second floor of the building or space, the one or more computing devices can determine the person has moved from the first floor to the second floor. Additionally, the one or more computing devices can determine the second floor is the present or last known location of the person within the building or space.

In some implementations, audio data obtained at (302) can be indicative of one or more trigger words (e.g., "Help", "I need Help", "Fire", etc.) uttered by a person within the building or space to indicate occurrence of an event, such as an emergency condition. The one or more computing devices can control operation of one or more connected devices associated with the building or space based, at least in part, on audio data indicative of the one or more trigger words. For instance, the one or more computing devices can be configured to activate (e.g., turn on) a camera in response to obtaining audio data indicative of the one or more trigger words. In this manner, the one or more computing devices can operate the camera to determine a location (e.g., room, floor, etc. of the building) of the emergency condition and/or type (e.g., fire, active shooting, etc.) of the emergency condition. Additionally, the one or more computing device can, as will be discussed below in more detail, be configured to provide a notification indicative of the event to one or more recipients included in a multi-tier notification tree.

At (306), the method 300 can include accessing, by the one or more computing devices, the multi-tier notification tree. In example embodiments, each tier of the multi-tier notification tree can include one or more recipients. At (308), the method 300 can include dynamically updating, by the one or more computing devices, the notification tree.

Figure 4:
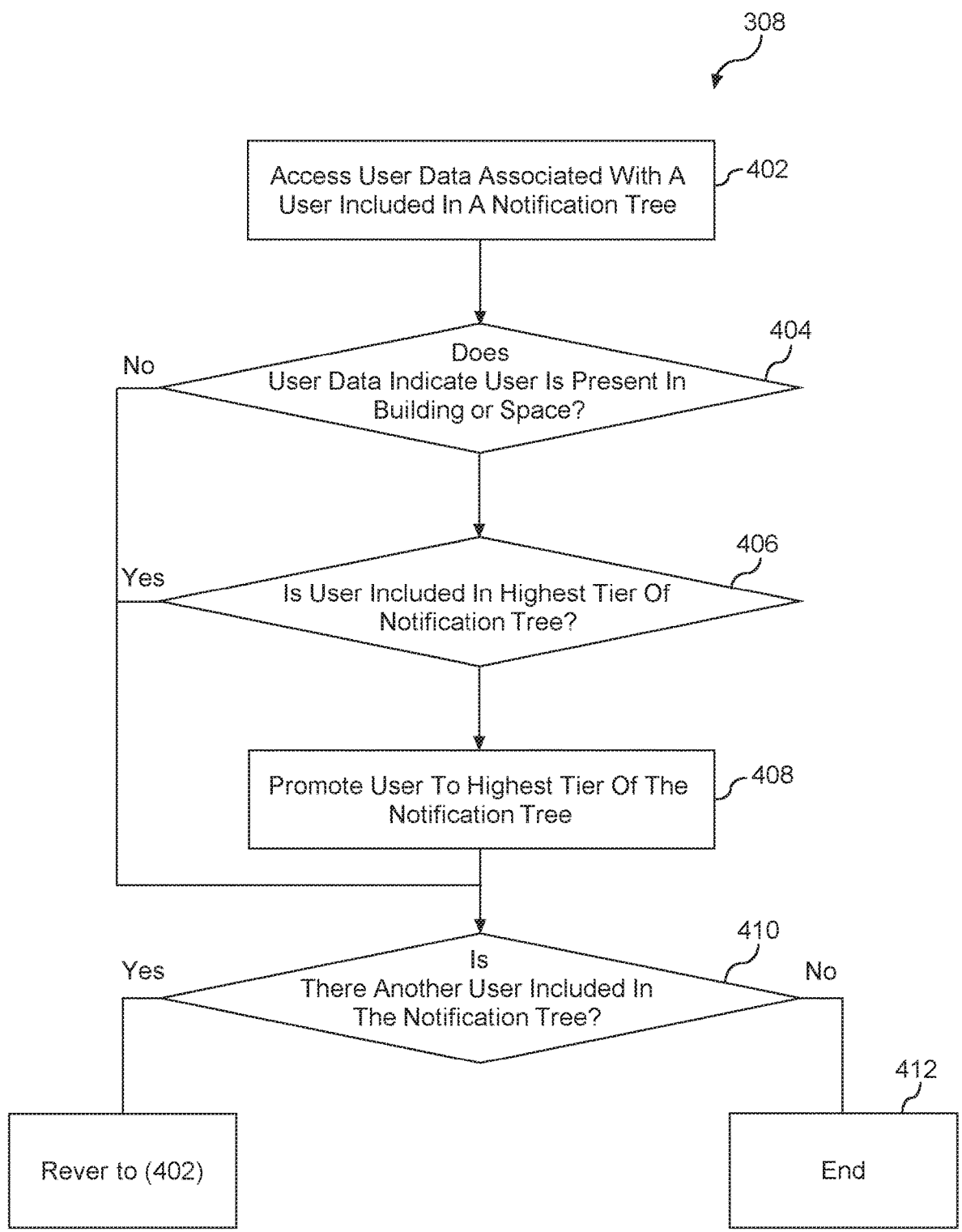
FIG. 4 depicts a flow diagram of a method for dynamically updating a notification tree according to example embodiments of the present disclosure.
Figure 5:
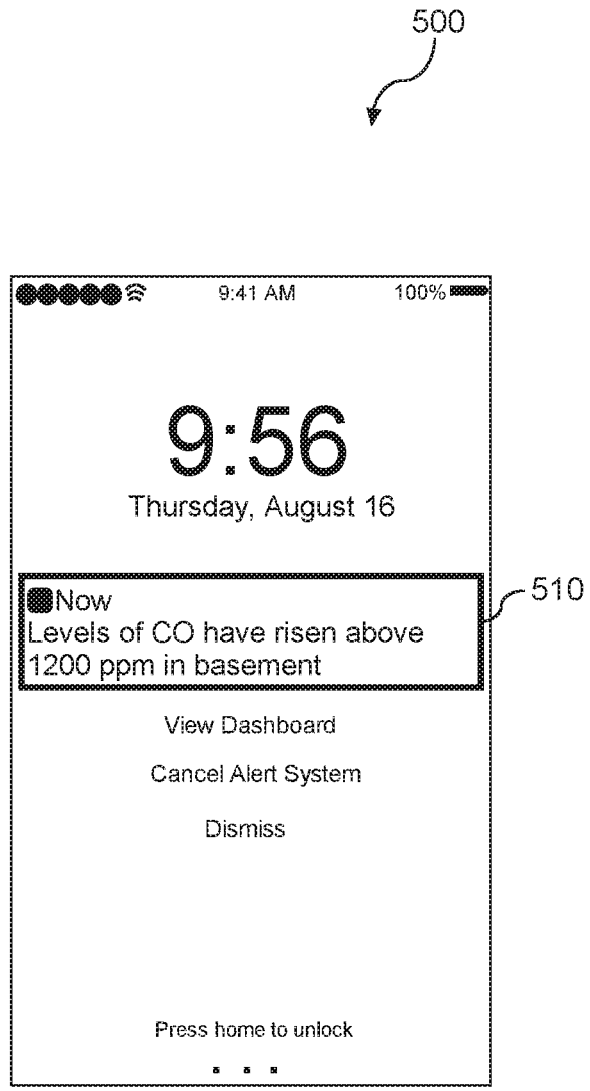
FIG. 5 depicts a user interface according to example embodiments of the present disclosure.

Referring briefly now to FIG. 4, dynamically updating the notification tree at (308) can include accessing, by the one or more computing devices, user data associated with a recipient included in the notification tree at (402). In example embodiments, the user data can indicate a location of the recipient. For instance, the user data can include location data (e.g., GPS data) obtained from a user device (e.g., smartphone, tablet, laptop, etc.) associated with the recipient. Alternatively or additionally, the user data can include calendar data associated with an electronic calendar stored on the user device. At (404), the one or more computing devices can determine whether the recipient is present within the building or space based, at least in part, on the data obtained at (402).

When the one or more computing devices determine the recipient is present within the building or space, the process of dynamically updating the notification tree at (308) proceeds to (406). Otherwise, the process of dynamically updating the notification tree at (308) proceeds to (410). At (406), the one or more computing devices determine whether the recipient is included in the highest priority tier of the multi-tier notification tree. If the one or more computing devices determine the recipient is not included in the highest priority tier, the process of dynamically updating the notification tree at (308) proceeds to (408). Otherwise, the process of dynamically updating the notification tree at (308) proceeds to (410).

At (408), the one or more computing devices promote the recipient to the highest priority tier of the multi-tier notification tree. In example embodiments, the recipient can be promoted from a lower priority tier (e.g., second tier, third tier, etc.) of the multi-tier notification tree to the highest tier (e.g., first tier) of the multi-tier notification tree. Once the recipient has been promoted to the highest tier of the multi-tier notification tree, the process of dynamically updating the multi-tier notification tree at (308) proceeds to 410.

At (410), the one or more computing devices determine whether additional recipients are included in the notification tree. If the one or more computing devices determine additional recipients are included in the notification tree, the process of dynamically updating the notification tree at (308) reverts to (402). Conversely, if the one or more computing devices determine additional recipients are not included in the notification tree, the process of dynamically updating the notification tree proceeds to (412). At (412), the process of dynamically updating the notification tree ends. It should be appreciated that one or more computing devices can perform multiple iterations of (402) through (410) to determine a location of every recipient included in the notification tree. It should also be appreciated that the one or more computing devices can be configured to dynamically update the notification tree at predetermined intervals of time (e.g., hourly, daily, monthly, etc.). For instance, the one or more computing devices can be configured to dynamically update the notification tree once every hour.

Referring again to FIG. 3, the method 300 can include, at (310), providing, by the one or more computing devices, a notification to one or more recipients included in the notification tree. In example embodiments, the notification can be indicative of the event detected at (304). For instance, the notification can be indicative of an emergency event, such as a fire, carbon monoxide leak, or any other suitable type of emergency event. In some implementations, the notification can also be provided via one or more connected devices located within the building or space. For instance, one or more connected devices configured to implement a digital assistant service (e.g., Amazon, Siri, Google, etc.) can be configured to emit an audible message indicative of the event. Alternatively or additionally, the audible message can be provided over a paging system associated with the building or space.

In some implementations, the process of dynamically updating the notification tree at (308) can include promoting one or more recipients within the building and included in a lower priority tier of the notification tree to the highest priority tier of the notification tree only for the duration of the event detected at (304). For instance, the one or more computing devices can be configured to demote the one or more recipients to the lower priority tier once a notification indicative of the event is acknowledged by a recipient included in the notification tree.

In some implementations, one or more connected devices configured to implement the digital assistant service can obtain data indicative of one or more voice commands (e.g., "Hey Siri, I need help", "Alexa, I need help", "Hey Google, I need help", etc.) uttered by a person within the building. The one or more connected devices can, in some implementations, be configured to process the data indicative of the one or more voice to determine occurrence of an event within the building. The one or more connected devices can be further configured to communicate data indicative of the event to the one or more computing devices to prompt the one or more computing devices to generate (e.g., deploy) a notification indicative of the event.

In alternative implementations, the one or more connected devices can be configured to communicate the data indicative of the one or more voice commands to the one or more computing devices, which can be configured to process the data to determine occurrence of an event within the building. Additionally, the one or more computing devices can be configured to generate a notification indicative of the event. In this manner, one or more recipients within the building or space can prompt the system of the present disclosure to generate (e.g., deploy) notifications indicative of events occurring within the building or space.

In some implementations, the notification can include information indicative of a location (e.g., room, floor, etc.) of the event detected at (304). For instance, the notification can indicate a floor of a multi-story building in which the event is occurring. In this manner, emergency personnel responding to the notification of the event can be notified of the location of the event. In some implementations, the notification can indicate a path emergency personnel can travel within the building or space to get to the event and render aid as needed. For instance, the path can be updated in real-time or near real-time based, at least in part, on data the one or more computing devices obtain from the one or more connected devices associated with the building or space. Alternatively or additionally, the notification can include the location of one or more recipients included in the notification tree and present in the building or space. In this manner, emergency personnel responding to an emergency event within the building or space can more readily locate the recipients.

At (312), the method 300 can include providing, by the one or more computing devices, a status report to authorized persons included in the notification tree. For instance, the one or more computing devices can be configured to provide the status report at predetermined intervals of time (e.g., hourly, daily, monthly, etc.). Alternatively or additionally, the one or more computing devices can be configured to provide the status report in response to a query (e.g., request) received from authorized persons. In this manner, the status report can be provided on an on-demand basis.

In some implementations, the status report can indicate a status of the plurality of connected devices associated with the building or space. For instance, the status report can indicate whether each connected device of the plurality of connected devices is active (e.g., online) or inactive (e.g. offline). In some implementations, authorized persons included in the notification tree can opt-in to receive the status reports. In this manner, authorized persons (e.g., building administrator and/or homeowner) can control whether they receive the status report.

Referring now to FIGS. 5-9, a user interface 500 associated with an application (e.g., web-based or mobile) executable by one or more computing devices 152 (FIG. 1) of the user device 150 (FIG. 1) is provided according to example embodiments of the present disclosure. As shown, the application can configure the one or more computing devices 152 to display a notification 510 on a display 154 (FIG. 1) of the user device 150. For instance, the notification 510 can be indicative of an event (e.g., CO leak) occurring within the building or space. In some implementations, the notification 510 can be pushed to the user device 150 in real-time. In this manner, a person associated with the user device 150 can be notified, in real-time, of an event (e.g., CO leak, fire, active shooting, etc.) occurring with the building or space. Alternatively or additionally, the user associated with the user device 150 can view the notification 510 without unlocking (e.g., entering a passcode) the user device 150.

Figure 6:
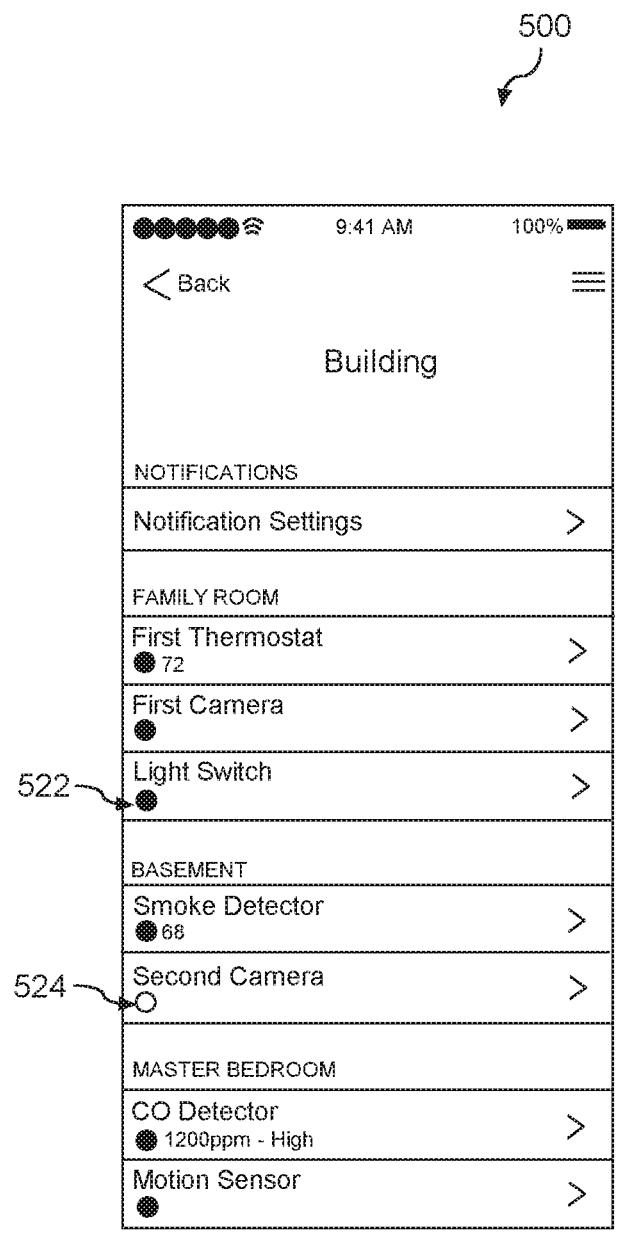
FIG. 6 depicts a user interface according to example embodiments of the present disclosure.

Referring now to FIG. 6, the user interface 500 can indicate a location (e.g., room or area) of a plurality of connected devices associated with a building (e.g., residential home) or space. Alternatively or additionally, the user interface 500 can indicate a status (e.g., online or offline) of each connected device of the plurality of connected devices.

For instance, the user interface 500 can include indicators 522, 524 indicative of whether a corresponding connected device is active (e.g., online) or inactive (e.g., offline). As shown, the indicator 522 corresponding to a light switch located in the family room can be illuminated to indicate the light switch is online. Conversely, the indicator 524 corresponding to a camera located in the basement of the building can be greyed out to indicate the camera is offline.

Figure 7:
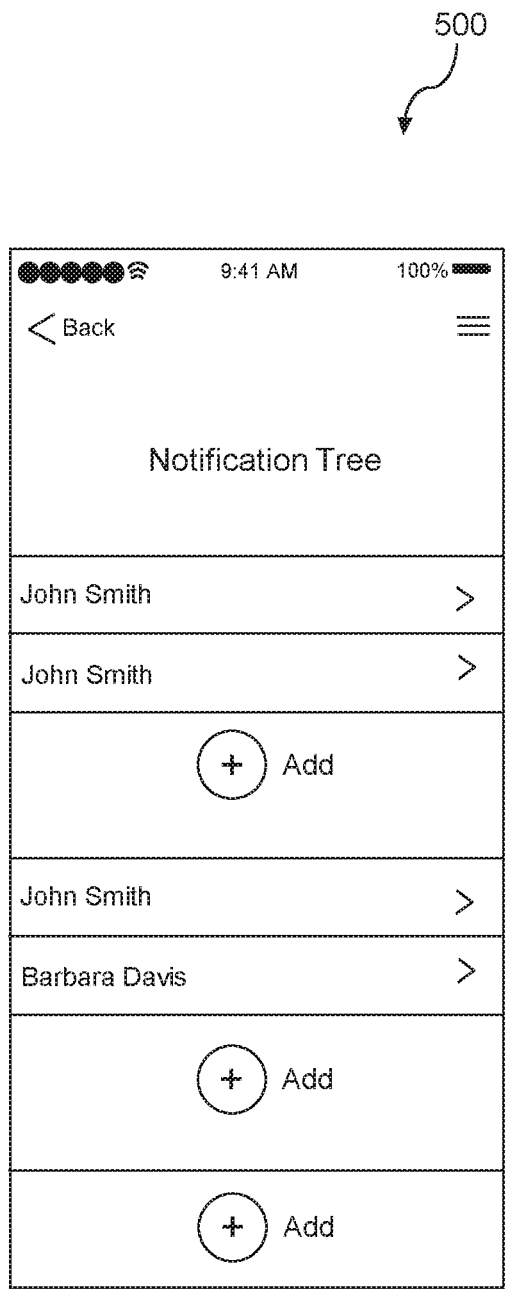
FIG. 7 depicts a user interface according to example embodiments of the present disclosure.

Referring now to FIG. 7, authorized persons, such as a homeowner or building administrator, can add or remove recipients from the notification tree 200 (FIG. 2) via the user interface 500. Alternatively or additionally, authorized persons can adjust the tier in which another recipient is included via the user interface 500. For instance, a homeowner can provide input via the user interface 500 to move a neighbor from the second tier 220 (FIG. 2) of the notification tree 200 to a third tier 230 (FIG. 2) of the notification tree.

Figure 8:
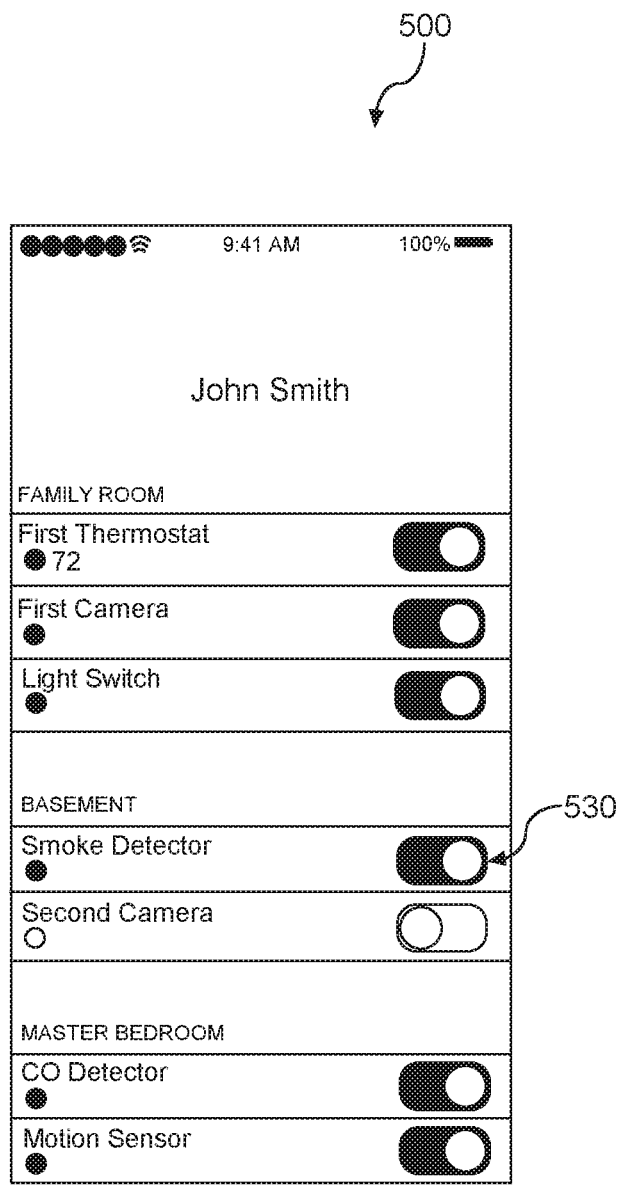
FIG. 8 depicts a user interface according to example embodiments of the present disclosure.

Referring now to FIG. 8, a recipient can adjust (e.g., opt-in or opt-out) the types of notifications they receive. As an example, the recipient can move (e.g., slide) a slider bar 530 to turn-on or turn-off notifications associated with each of the plurality of connected devices. As shown, the recipient has opted to receive notifications associated with a smoke detector located in a basement of the building. Conversely, the recipient has opted to ignore notifications associated with a camera located in the basement.

In some implementations, the recipient can opt to snooze one or more notifications not indicative of an emergency condition. For instance, the one or more notifications not indicative of an emergency condition can be snoozed during certain hours (e.g., evening hours from 6 PM to 6 AM) for one or more connected devices associated with the building or space. In some implementations, the one or more notifications that have been snoozed can continue to be provided to a user device associated with a recipient included in the notification tree. However, since the one or more notifications have been snoozed, the user device may not emit an audible sound to notify the recipient of the one or more notifications.

Figure 9:
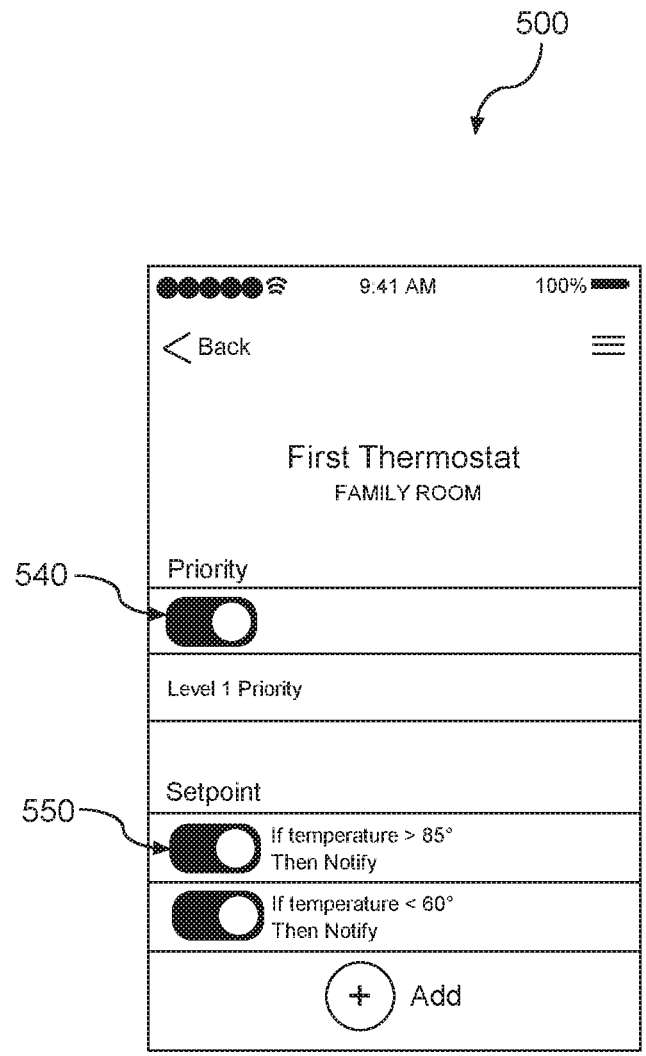
FIG. 9 depicts a user interface according to example embodiments of the present disclosure.

Referring now to FIG. 9, a recipient can adjust a priority of notifications associated with the plurality of connected devices via the user interface 500. For example, the recipient can move (e.g., slide) a slider bar 540 to elevate the priority of notifications associated with a thermostat located in the family room of the building. More specifically, the priority of notifications can be elevated to a level one priority. In this manner, notifications associated with the thermostat located in the family room can be provided to each member included in the notification tree 200 (FIG. 2). Alternatively or additionally, the recipient can move a slider bar 550 to adjust one or more setpoints that can trigger the notification associated with the thermostat. For instance, the setpoints can prompt the one or more computing devices to provide a notification indicative of an event, such as temperature of a room or area within the building deviating from a setpoint by more than a predetermined amount.

In some implementations, a homeowner or building administrator can add a new building or space via the user interface 500 of the application (e.g., mobile app, web-based app) executed via the one or more computing devices 152 of the user device 150. Upon adding the new building or space, the homeowner or building administrator can be prompted to copy the recipients included in the notification tree for the existing building or space to the notification tree for the new building or space. It should be appreciated, however, that the homeowner or building administrator can make adjustments to the notification tree. For instance, the homeowner or building administrator can remove a recipient that is not associated with the new building or space. Alternatively or additionally, the homeowner or building administrator can add a recipient that is associated with the new building or space but not the existing building or space.

In some implementations, the one or more computing devices can be configured to determine whether a connected device associated with the new building or space corresponds to a connected device associated with the existing building or space. For example, the one or more computing devices can determine a smoke detector associated with the new building or space is the same (e.g., same make and/or model) as a smoke detector associated with the existing building or space. Additionally, the application executed via the one or more computing devices of the user device can prompt the homeowner or building administrator to determine whether the homeowner or building administrator wants to apply one or more settings associated within the smoke detector in the existing building or space to the smoke detector associated with the new building or space. For instance, the one or more settings can include a threshold amount of carbon monoxide needed to trigger deployment of a notification indicative of a carbon monoxide leak within the building or space. In some implementations, the homeowner or building administrator may adjust the threshold amount for the smoke detector associated with the new building or space to be different (e.g., lower or higher) compared to the threshold amount for the smoke detector associated with the existing building or space.

Figure 10:
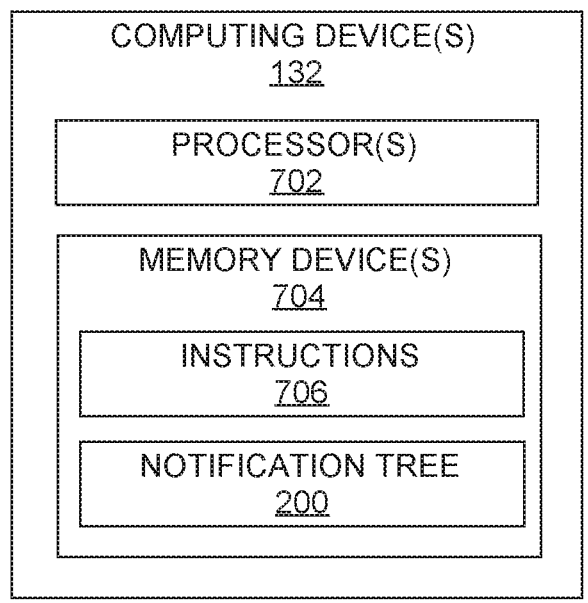
FIG. 10 depicts a block diagram of components of a computing device according to example embodiments of the present disclosure.

FIG. 10 illustrates one embodiment of suitable components of a computing device 132. As shown, the computing devices 132 can include one or more processors 702 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the computing device 132 can include a memory device 704. Examples of the memory device 704 can include computer-readable media including, but not limited to, non-transitory computer-readable media, such as RAM, ROM, hard drives, flash drives, or other suitable memory devices. The memory device 234 can store information accessible by the processor(s) 702, including computer-readable instructions 706 that can be executed by the processor(s) 702. The computer-readable instructions 706 can be any set of instructions that, when executed by the processor(s) 702, cause the processor(s) 702 to perform operations. The computer-readable instructions 706 can be software written in any suitable programming language or can be implemented in hardware.

In some implementations, the computer-readable instructions 706 can be executed by the processor(s) 702 to perform operations, such as dynamically updating the notification tree 200. As shown, the notification tree 200 can be stored in the memory device 704. It should be appreciated, however, that the notification tree 200 can be stored at any suitable location associated with the computing device 132.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of providing a notification associated with at least one of a plurality of connected devices, the method comprising:
obtaining, by one or more computing devices, data from two or more connected devices,
wherein a first connected device of the two or more connected devices comprises one or more processors configured to execute a first operating system, and
wherein a second connected device of the two or more connected devices comprises one or more processors configured to execute a second operating system that is different from the first operating system;
determining, by the one or more computing devices, occurrence of an event based, at least in part, on the data obtained from the two or more connected devices;
accessing, by the one or more computing devices, a multi-tier notification tree; and
providing, by the one or more computing devices, a notification indicative of the event to one or more recipients included in the multi-tier notification tree.

2. The method of claim 1, further comprising:
accessing, by the one or more computing devices, user data associated with the one or more recipients included in the multi-tier notification tree; and
dynamically updating, by the one or more computing devices, the multi-tier notification tree based, at least in part, on a change in the user data.

3. The method of claim 2, wherein dynamically updating the multi-tier notification tree comprises:
promoting, by the one or more computing devices, a recipient from a lower priority tier of the multi-tier notification tree to a higher priority tier of the multi-tier notification tree based, at least in part, on the change in user data associated with the recipient.

4. The method of claim 3, wherein the user data is indicative of a location of the one or more recipients included in the multi-tier notification tree.

5. The method of claim 3, further comprising:
demoting, by the one or more computing devices, the recipient from the higher priority tier to the lower priority tier when the notification indicative of the event is acknowledged by the recipient or another recipient included in the notification tree.

6. The method of claim 1, wherein providing a notification indicative of occurrence of the event to the one or more recipients included in the notification tree comprises:
providing, by the one or more computing device, the notification to one or more recipients included in a first tier of the multi-tier notification tree;
determining, by the one or more computing devices, the one or more recipients included in the first tier of the multi-tier notification tree did not acknowledge the notification; and
responsive to determining the one or more recipients included in the first tier of the multi-tier notification tree did not acknowledge the notification, providing, by the one or more computing devices, the notification to one or more recipients included in a second tier of the multi-tier notification tree.

7. The method of claim 6, wherein providing a notification indicative of occurrence of the event to one or more recipients included in the notification tree further comprises:
determining, by the one or more computing devices, the one or more recipients included in the second tier of the multi-tier notification tree ignored the notification; and
providing, by the one or more computing devices, the notification to one or more recipients included in a third tier of the multi-tier notification tree in response to determining the one or more recipients included in the second tier ignored the notification.

8. The method of claim 6, wherein determining the one or more recipients included in the first tier of the multi-tier notification tree did not acknowledge the notification comprises:
determining, by the one or more computing devices, a predetermined amount of time has lapsed without receiving data indicating acknowledgement of the notification.

9. A method of providing a notification associated with at least one of a plurality of connected devices, the method comprising:
obtaining, by one or more computing devices, data from one or more connected devices;
determining, by the one or more computing devices, occurrence of an event based, at least in part, on the data obtained from the one or more connected devices;
accessing, by the one or more computing devices, a multi-tier notification tree;
generating, by the one or more computing devices, a report based, at least in part, on the data obtained from the one or more connected devices; and
providing, by the one or more computing devices, (i) a notification indicative of the event to one or more recipients included in the multi-tier notification tree and (ii) the report to one or more recipients included in the multi-tier notification tree.

10. The method of claim 9, wherein generating the report comprises:
determining, by the one or more computing devices, a status of a first connected device based, at least in part, on data obtained from the first connected device; and
determining, by the one or more computing devices, a status of a second connected device based, at least in part, on data obtained from the second connected device.

11. The method of claim 10, wherein the first connected device and the second connected device include a smoke detector, a light bulb, a thermostat, a camera, a microphone, a humidity sensor, a doorbell, a motion sensor, a water valve sensor, a door lock, a light switch, a garage door opener, or a carbon monoxide detector.

12. The method of claim 10, wherein:
the status of the first connected device indicates whether the first connected device is online or offline; and
the status of the second connected device indicates whether the second connected device is online or offline.

13. The method of claim 12, wherein when the status of the first connected device indicates the first connected device is offline, generating the report further comprises:
determining, by the one or more computing devices, an amount of time the first connected device has been offline.

14. The method of claim 1, further comprising:
determining, by the one or more computing devices, a priority of the event; and providing, by the one or more computing devices, the notification to the one or more recipients included in the multi-tier notification tree based, at least in part, on the priority of the event.

15. The method of claim 14, wherein when the priority of the event corresponds to an emergency condition, providing the notification comprises:
providing, by the one or more computing devices, the notification to each recipient included in the multi-tier notification tree.

16. The method of claim 1, wherein the report further comprises:
determining, by the one or more computing devices, that the event represents an emergency condition; and
promoting, by the one or more computing device, recipients included in a lower tier of the multi-tier notification tree to a higher tier of the multi-tier notification tree for the duration of the event,
demoting, by the one or more computing device, the recipients promoted to the higher tier back to the lower tier after the duration of the event.

17. A system for providing a notification associated with at least one of a plurality of connected devices, the system comprising:
one or more computing devices configured to:
obtain data from one or more connected devices;
determine occurrence of an event based, at least in part, on the data obtained from the one or more connected devices
determine, by the one or more computing devices, a status of a first connected device based, at least in part, on data obtained from the first connected device, wherein the status of the first connected device indicates whether the first connected device is online or offline;
access a multi-tier notification tree; and
provide a notification to one or more recipients included in the multi-tier notification tree, the notification indicative of the event; and
provide a report to one or more recipients included in the multi-tier notification tree, the report based, at least in part, on the data obtained from the one or more connected devices, the report including the status of the first connected device.

18. The system of claim 17, wherein the one or more computing devices are further configured to:
obtain data from a first connected device comprising one or more processors configured to execute a first operating system; and
obtain data from a second connected device comprising one or more processors configured to execute a second operating system.

19. The system of claim 17, wherein the one or more computing devices are further configured to:
access user data associated with the one or more recipients included in the multi-tier notification tree; and
update the multi-tier notification tree based, at least in part, on a change in the user data.

20. The system of claim 17, wherein the report further comprises:
an amount of time the first connected device has been offline.

* * * * *